July 15, 1924.
H. FERGUSON
AGRICULTURAL IMPLEMENT
Filed Oct. 12, 1922
1,501,652
4 Sheets—Sheet 1
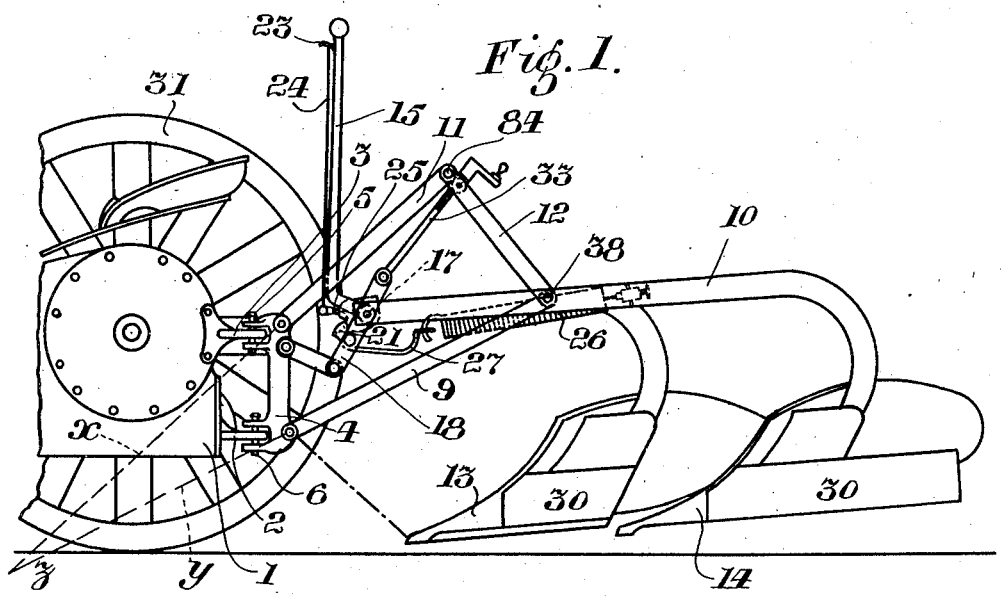
Inventor:
Harry Ferguson
By Diederstein + Fairbanks
Attorneys

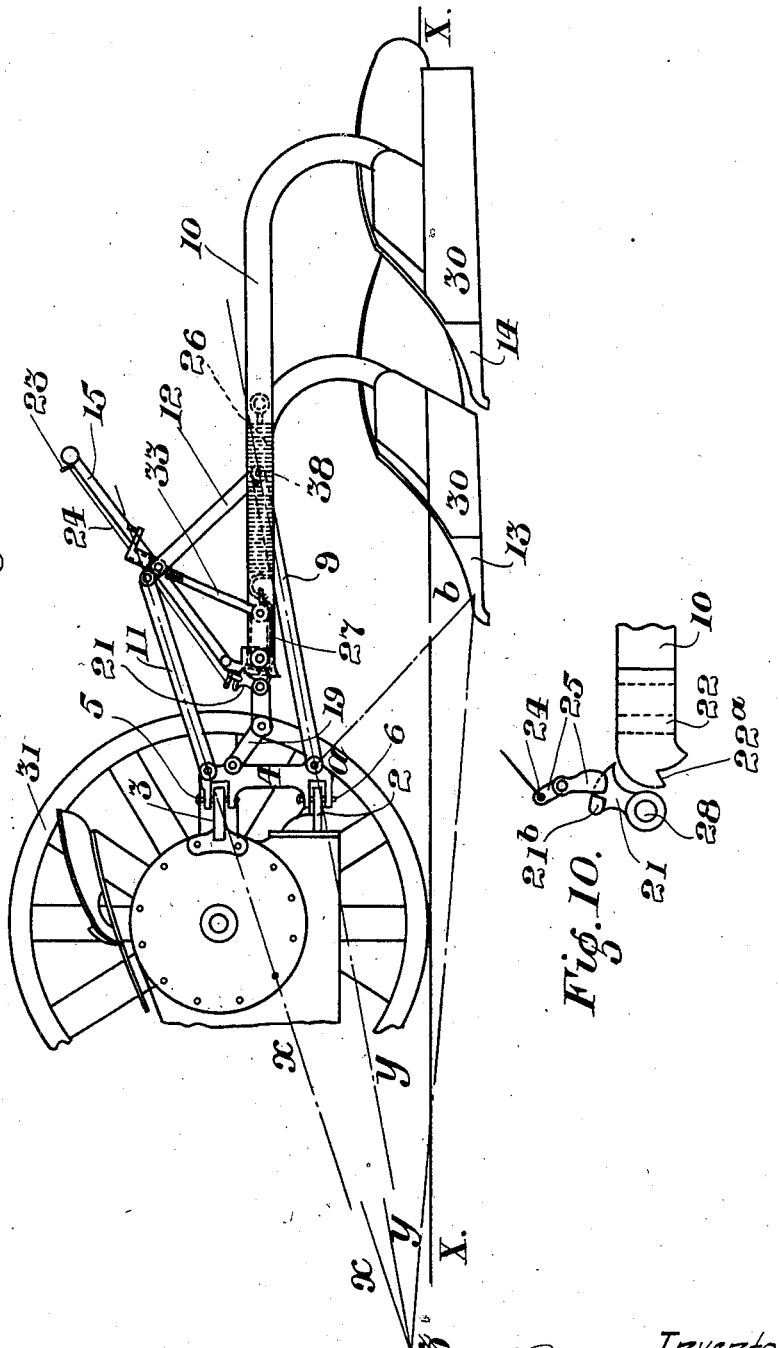

July 15, 1924.
H. FERGUSON
AGRICULTURAL IMPLEMENT
Filed Oct. 12, 1922
1,501,652
4 Sheets-Sheet 3
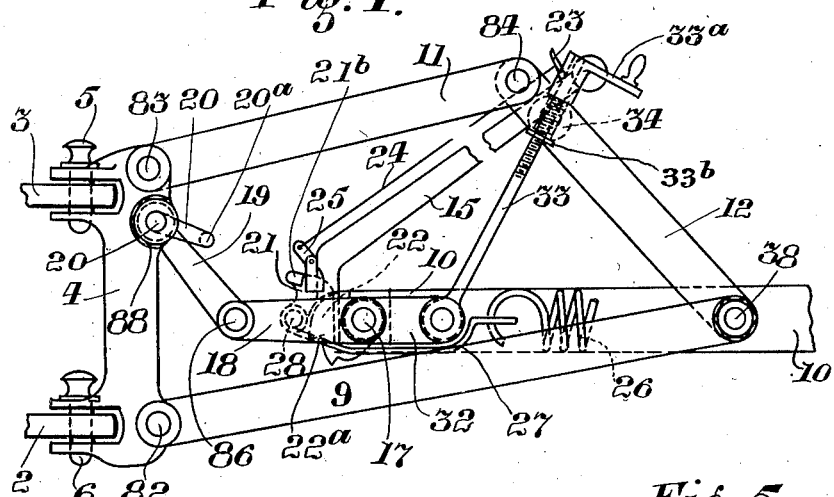
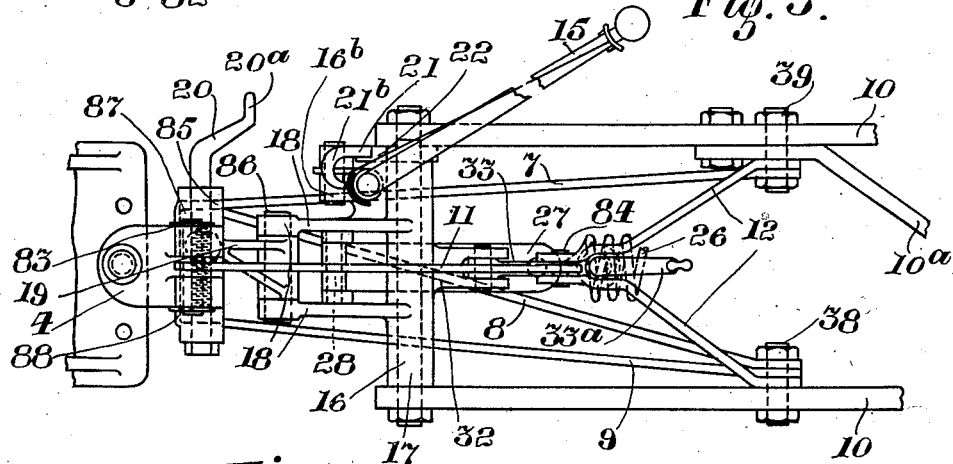
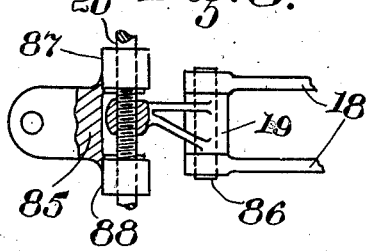
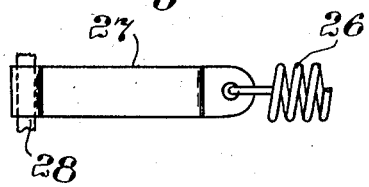
Inventor:
Harry Ferguson.
By Wiedersheim & Fairbanks
Attorneys.

July 15, 1924.   1,501,652
H. FERGUSON
AGRICULTURAL IMPLEMENT
Filed Oct. 12, 1922   4 Sheets-Sheet 4
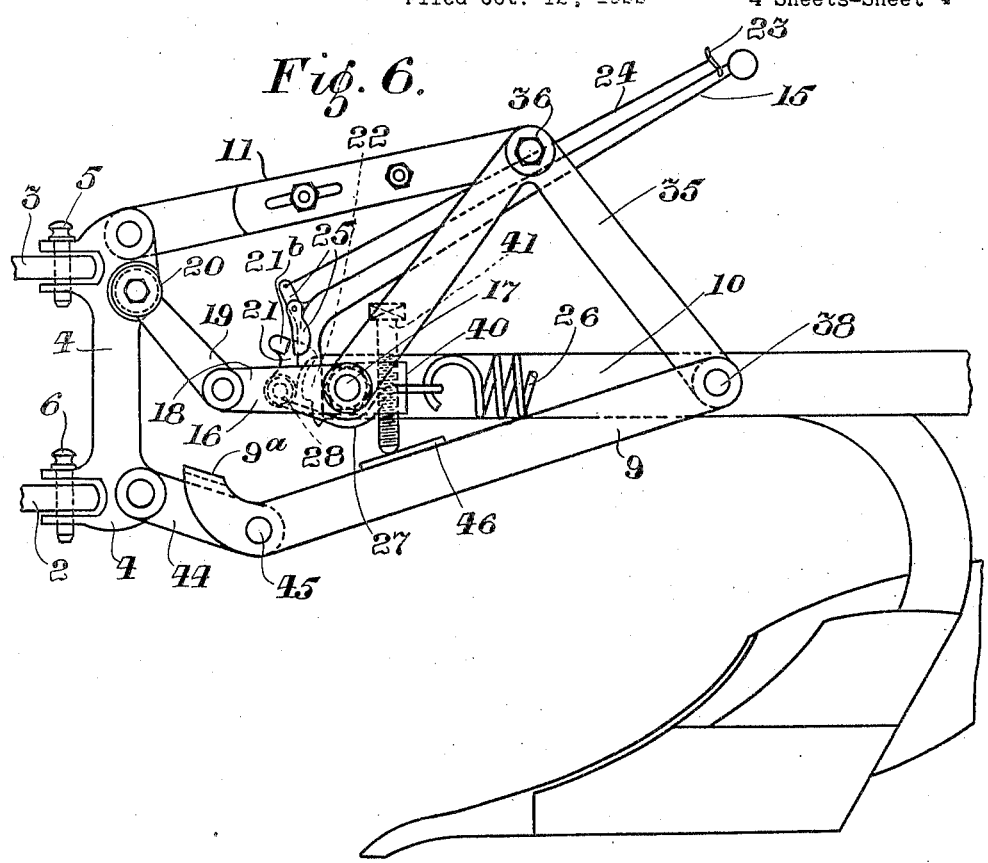
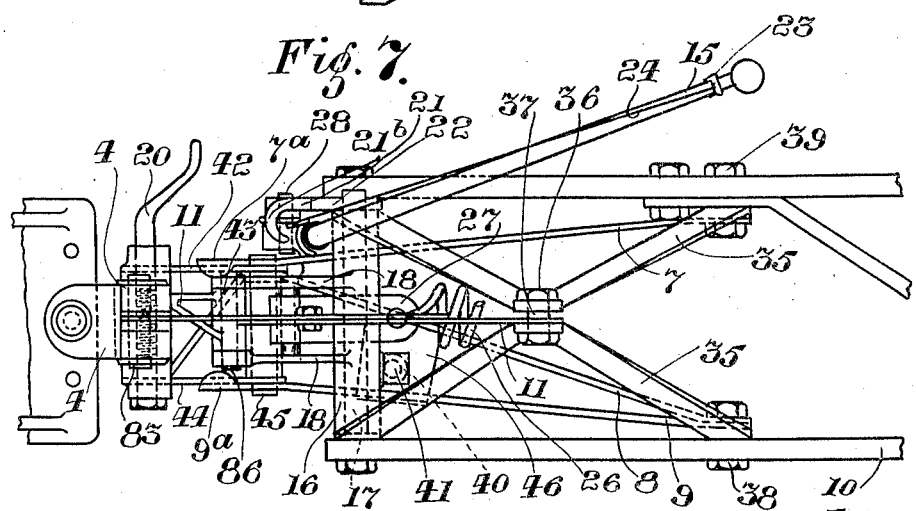

Patented July 15, 1924.

1,501,652

UNITED STATES PATENT OFFICE.

HARRY FERGUSON, OF BELFAST, IRELAND.

AGRICULTURAL IMPLEMENT.

Application filed October 12, 1922. Serial No. 593,984

*To all whom it may concern:*

Be it known that I, HARRY FERGUSON, of 83 May Street, Belfast, Ireland, a subject of the King of Great Britain and Ireland, have invented certain new and useful Improvements Relating to Agricultural Implements, of which the following is a specification.

This invention relates to improvements in mechanically or tractor drawn agricultural implements such as ploughs, disc harrows, cultipackers, drills, harrows, cultivators, and the like.

Hitherto, implements adapted to be operated by tractors have run on a wheel, or wheels, or a skid, or skids, behind the tractor and have been supported in, or on, the ground by a wheel, or wheels, or equivalent. This method of supporting them added to the cost and to the draft, and, further, to the wear and tear of the tractor and to the consumption of fuel. There have also been many other disadvantages, for instance, where implements have hitherto been carried on the tractor, no means have been provided for keeping the implement at a regular depth of cut while the tractor is operating over undulating ground, and no provision has been made for lateral swivelling movement of the implement relatively to the tractor while the tractor is turning, as when ploughing, for example. Lack of provision for relative up and down and lateral movements between the implement and the tractor has made it impossible, hitherto, to make a satisfactory implement, the weight of which would be carried on the tractor while the implement is in operation in, or on, the ground and also while the implement is not at work.

Under this invention automatic control means is provided whereby the implement is kept at a regular working depth irrespective of normal up and down movements of the tractor, and is so arranged that, as the tractor follows the irregularities, or contour, of the ground, it utilizes the resistance to the implement and its penetration to automatically control the working depth. Implements, such as referred to, are, or may be so connected with the tractor that the weight of the implement is carried on the tractor both when in operation and when not in operation, provision being made for up and down movement of the implement relatively to the tractor to prevent, or limit, the pitching of the implement by the tractor when the tractor is following the contour of the ground. Provision may also be made for swivelling lateral movement of the implement relative to the tractor to allow the tractor to turn freely, as when ploughing for example. Provision may also be made for both up and down movements, and swivelling lateral movement as described.

A few of the advantages arising from this invention may be cited. An implement according to the invention would be much lighter in draft because there would be less friction. The fact of the implement being carried on the tractor would throw an added weight on the rear wheels of the tractor and increase their adhesion or grip.

The control means for keeping the implement at a regular depth of cut, as stated, and for preventing it pitching up and down with the up and down movement of the tractor, may be so designed as to act only under abnormal resistance of the draft. This may be effected by providing a connection between the implement and the tractor which allows for relative movement within the required limits and, when the limit of free movement has been reached, allows the implement to be brought under the action of the automatic control means so that the increased draft, under abnormal loads, can be used to keep the implement at a regular depth of cut in the ground.

The means employed for obtaining regular depth of cut may comprise a coulter which is so made and supported as to be free to swing forwards and backwards and is provided with means whereby it can be coupled at its forward end to the lifting mechanism of the implement in such a manner as to exert a pull, or an increased pull, on the lifting mechanism under abnormal resistance.

An implement having automatic depth control means as described may also have, in combination, spring means to balance the weight of the implement so that it will be easy to operate, and means, hereafter described, whereby the spring means can be put out of action, or partly out of action, to prevent it acting wholly, or partly, while the implement is at work in the ground so as to have the benefit of the weight of the implement to assist in keeping it properly at work in the ground.

Automatic control as described may, under another method, be obtained by providing means in the connection between the implement and the tractor and of such nature that the spring means will not come into operation or affect the relationship between the implement and the pulling means under normal conditions but when an abnormal resistance, or reduction in resistance, is encountered the spring means will come into action to counteract the increased or decreased resistance and thus will keep the implement at a regular depth of cut. The spring means, as described, may be adapted to be so acted on by the pitching of the tractor as to react on the implement for the purpose of keeping the implement at a regular depth of cut.

It is possible with the connection and automatic control means to connect up a portion of the lifting mechanism directly, or indirectly, to the frame of the implement in such a way as to make the draft and penetration balance each other and thus keep the implement at a regular depth of cut while the tractor follows the contour of the ground.

An implement having automatic depth control means as described may also have, in combination, a connection for coupling the implement to the tractor comprising means which, in operation, give a line of draft from a different position to that of the actual connection between the implement and the tractor.

An implement having automatic depth control means as described may also have means whereby the connection of the implement and tractor is effected through the medium of a forked head and pin connection for the purpose of making the implement readily attachable and detachable whilst allowing the necessary relative movements as described.

An implement having automatic depth control means as described may be so made and its control so designed and its connection to the tractor may be such that all the mechanism for controlling and adjusting the implement can be carried on the implement itself.

An implement having automatic depth control means as described may also have, in combination, means for utilizing the weight or resistance of the tractor in order to keep the implement down to its work whilst in operation, the means allowing the necessary relative movement between the implement and the tractor.

An implement having automatic depth control means as described may also have, in combination, means whereby the rear wheels of the tractor can be caused to skid, when the implement meets an insurmountable obstacle, thereby dispensing with a safety device.

An implement having automatic depth control means as described may also have, in combination, means for countering the tendency of the tractor to overturn backwards and injure the operator.

The invention will now be described, simply by way of example, in its application to a tractor plough; and whilst such is the case it is to be understood the invention is not limited thereto, but, that, generally, the connections shown may be used, with or without modification, in connection with other implements such as are mentioned in the opening paragraph of the specification:—

On the drawings:—

Fig 1 is an elevation of the rear portion of a tractor showing the connecting means between the tractor and the plough in accordance with the invention. In this view the plough is shown out of the ground and partly raised for transport.

Fig. 2 is a plan view corresponding to Fig. 1.

Fig. 3 is an elevation similar to Fig. 1 but showing the plough shares, in the ground, in the working position.

Fig. 4 is an enlarged detail view of the connecting means between the plough and the tractor, one side of the frame being removed to more clearly show the mechanism which would otherwise be hidden by said frame.

Fig. 5 is a plan view corresponding to Fig. 4, but with the frame 10 complete.

Fig. 6 is an elevation showing another method of connecting a plough and a tractor in accordance with the invention. Part of frame 10 is removed in this view.

Fig. 7 is a plan view corresponding to Fig. 6, but with the frame complete.

Figs. 8, 9 and 10 are detail views.

The tractor 1 (which in the drawings is a four wheeled "tractor of common type") has a draw bar 2 and a corresponding abutment 3. A plough head 4 is pivotally connected to the draw bar 2 and the abutment 3, by means of the drop pins 5 and 6, its jaws engaging the abutment and the draw bar through which the drop pins pass as clearly shown in Figs. 1 and 4, so that, as will be readily understood, the plough head can freely swing or turn from side to side upon the abutment and the draw bar. The plough frame 10 is connected to the head 4 by means of a lower set of links 7, 8 and 9 (see particularly Figs. 2 and 5) which are movably jointed, on the one hand, to the pivot pin 82 of the member 4, and, on the other hand, by bolts 38 and 39 to the frame. The frame is also connected to the member 4 by means of a single link 11 and a double strut 12, 12, the parts being pivotally connected together by pivot pins 83 and 84 and pivot bolts 38 and 39. The whole link connection can move bodily upwards and downwards as the implement and tractor change their relative positions owing to the contour of the ground over which the implement is drawn.

The plough may be lifted or lowered by power taken from the tractor but in the example shown it is operated manually by means of the control lever 15 which is secured rigidly at its lower end to a hollow cross head 16 which is arranged between the parallel sides 10 and 10 of the plough frame and is held in place by means of a cross shaft or long bolt 17. The cross head 16 has two forwardly projecting arms 18 between which a pivotal link 19 is arranged and is held in place by a pin 86. As will be seen at Figs. 5 and 8 this link has converging members which, at their upper ends, are made one with a sleeve 85 mounted on a cross shaft 20 provided with a turning handle 20$^a$, the shaft being mounted in bosses 87, 88 on the plough head 4, all as shown in the detailed view, Fig. 8. This shaft which is screw threaded engages with an internal thread in the sleeve 85 so that, by rotating the handle 20$^a$, the screw can be turned and the sleeve 85 made to move laterally and at the same time move the cross head 16 and the plough frame and shares laterally. A forward pull of the lever 15, owing to the fact that its lower end is made one with the cross head 16, turns the latter upon its shaft 17 with the result that the plough frame 10, together with the shares, are raised and when the plough is not in operation it remains in this position attached to the rear of the tractor, being retained in place by the action of the pawl 21 which engages in the tooth 22$^a$ of the toothed sector or quadrant 22 at the end of the plough frame as shown clearly in detail view at Fig. 10. To release the plough, so that it can be lowered, the pawl 21 is pulled out of engagement with the tooth 22$^a$ by operating the trigger 23, trigger rod 24 and pawl lever 25, whereafter a rearward movement of the lever 15 lowers the shares into the ground.

The cross head 16 has a rearward arm 32 to which is pivotally secured a depth adjusting shaft 33 whose upper end is screw-threaded and passes through a correspondingly screw-threaded sleeve 33$^b$ rotatably mounted (but not movable axially) in a ball-nut 34 pivotally secured between the parts of the strut 12. On its upper end the sleeve 33$^b$ is provided with a hollow handle 33$^a$, the handle forming an enlarged continuation of the sleeve. At its lower end the sleeve has a retaining collar. The sleeve is retained in place in the ball nut between the collar and the enlargement. By turning the handle 33$^a$ the shaft 33 can be screwed up or down in its nut 34 and, in so doing, turn the arm 32 and the cross head 16 about the shaft 17. The so called "quadrant" 22 is mounted on the shaft 17 and keyed to one of the frame members 10. This quadrant has a notch 22$^a$ with which the pawl 21, carried on the pin 21$^a$ in the projection 16$^b$ of the cross head, can engage. This pawl has a hook projection 21$^b$ with which the pivoted crank lever 25 can engage.

For the purpose of balancing the weight of the implement a spring 26 is provided, this spring, being connected to a spring link 27 (see also detail view, Fig. 9) which is connected, at its front end, by means of a pin 28 to the arms 18 of the cross head 16, the spring link being so connected that it can turn about the pin 28. At its rear end the spring 26 is adjustably connected, by means of an adjusting screw 29, to the plough frame member 10$^a$ (see Fig. 2). The spring acts in the following manner:—

When the plough is not in operation, as in Fig. 1, the spring 26 is under tension and exerts a pull on the arms 18 (Fig. 5) of the cross head 16 thereby tending to turn the cross head about its shaft 17 and raise the plough frame and the plough. When ploughing at the depth illustrated in Fig. 3, where X—X indicates the ground line, there is no tendency to lift the plough out of the ground because the cross head arms 18 are in such a position, as shown, that the pull of the spring 26 passes through the axis of the shaft 17, the spring being consequently at its dead point and ineffective to raise the plough; but when ploughing at a greater depth the arms 18 move upwards past the dead centre and the spring 26 then actually tends to keep the plough down in the ground. The link 27 is bent sufficiently to enable the arms 18 to move freely upwards.

The plough does not require to be supported on wheels, as usual, as, when it is at work in the ground, the link mechanism before referred to supports it and holds it in such manner that the land-side 30 of the shares does not bear on the furrow bottom and is, therefore, not supported by the bottom, the weight of the implement being carried by the tractor.

The mechanism as shown, gives an automatic control of the depth at which the shares shall work when the tractor is moved over undulating ground, the object being to have a uniform depth of cut throughout the ploughing operation no matter how the tractor and plough may have to move upwards and downwards when passing over more or less undulating territory.

The action is as follows:—

When the locking mechanism for the implement is released by disengaging the pawl 21 from the notch 22$^a$ by the operation of the trigger 23 and then lowering the plough shares into the ground by moving the hand-lever 15 the penetration of the shares as the tractor moves forward will force them downward into the ground to a point where the draft of the tractor being met by the resistance of the ground is balanced by the amount of penetration (this giving the normal working position of the implement and tractor relatively to each other when operating over level ground) but when, for example, the rear wheel, or wheels, 31 of the tractor drop into a hollow the tendency will be to drag the plough down and so increase its depth but this movement causes an additional resistance and rearward and upward thrust on the plough bottoms 13 and 14 with the result that the plough frame 10, together with the shares, tends to swing angularly upwards around the pivot pins 38, 39, of the strut 12 and this, in turn, tends to dip the front end of the plough frame downwards and with it the cross head 16 but any downward movement of the cross head exerts a pull on the depth adjusting shaft 33 and is resisted thereby as the upper end of the shaft 33 is connected to the strut 12 with the result that the cross head 16 tends to turn about the shaft 17 and exert a lifting movement on the plough frame 10 through the medium of the cross head arms 18 and the connecting link 19 thereby automatically preventing the shares going too deeply into the ground.

Should the rear wheels of the tractor rise on a height the tendency will be to lift the shares out of the ground and so reduce the rearward resistance on the plough bottoms 13 and 14, with the result that the front end of the plough frame 10 will tend to swing upwards. This tendency is countered and prevented, as an upward movement of the plough frame 10 would carry with it the cross head 16, and movement of the cross head upwards would put pressure on the shaft 33 through the medium of the cross head arm 32 and this would tend to turn the cross head 16 on its shaft 17 and, thus, automatically lower the implement into the ground.

Adjustment for depth is obtained by turning the handle at the upper end of the shaft 33, thereby raising or lowering the upper end of the strut 12 relatively to the cross head arm 32.

Fig. 6 shows another method of carrying out the invention. The construction differs from that just described but the principle is the same.

In this case the strut 12, in Fig. 1, and the shaft 33 are dispensed with and V struts 35 are substituted. These V struts are bolted rigidly together at their upper ends by the bolt 36, a tubular distance piece 37 being provided, against which the struts bear. These struts are held rigidly to the plough frame 10 by the bolts 38 and 39 and the cross head shaft 17. Adjustment for depth is, in this example, obtained by providing the cross head 16 with an extension 40 through which is screwed the depth limiting screw 41. By raising or lowering this screw the depth of cut can be increased, or diminished, as required.

The lower link members 7, 8 and 9 are, in this case, shortened and three short link members 42, 43 and 44 are provided between the forward end of the link members 7, 8 and 9 and the plough head 4. The links are all connected, as shown, by a pin 45 which allows the links up and down movement, relatively to each other, within predetermined limits. The links 7 and 9 are turned upwards at their forward ends and bent over so as to form two extensions, or plates, 7ᵃ and 9ᵃ, which act as stoppers by coming against the short links 42 and 44. When the plough frame is lifted upwards (for transport) by the lifting mechanism, the plates 7ᵃ and 9ᵃ give the necessary support to enable the plough bottoms to be raised sufficiently by the lifting mechanism to permit of the whole plough being carried clear of the ground.

In Fig. 6 the short ends and the long ends of the composite lower links are shown at their approximate angles to each other under normal draft loads on level ground, but when, for example, the rear wheel, or wheels, of the tractor drop into a hollow, the tendency is to take the plough down and so increase the depth. Any increase in the depth, however, puts additional tension on the composite bottom link assembly and tends to straighten it out. As it straightens out it rises upwards and raises with it the depth plate 46 which is fixed to, or forms part of, the links 8 and 9. As the depth limiting screw 41 is raised upwards by the straightening out of the lower link assembly it turns the cross head 16 on its shaft 17. This movement, in turn, exerts a lifting movement on the plough frame 10 through the medium of the cross head arms 18 and the connecting link 19, and, thus, the implement will be automatically kept at a regular depth of cut.

Under working conditions the penetration of the shares, and the weight of the implement keep the screw 41 pressed hard down on the depth plate 46. When the rear wheels of the tractor rise on a height the tendency is to lift the implement out of the ground and thus reduce the draft. Any reduction of the draft, however, reduces the tension on the lower link assembly, with the result that it collapses slightly and takes the depth plate 46 away from the point of the depth regulating screw 41. The penetration of the implement, and its weight makes the depth screw 41 follow the plate 46 and any movement of the depth screw 41 downwards turns the cross head 16 on the shaft 17. This movement, in turn exerts a downward movement on the plough frame 10 through the medium of the cross head arms 18 and the connecting link 19, and, thus the implement is automatically kept at a regular depth of cut.

As will be seen from the drawings, Figs. 1 and 3, the link 11, and links 7, 8 and 9 diverge slightly from the points of attachment to the member 4, whilst the lower link assembly 7, 8 and 9 is longer than the upper link 11, and it will be seen from Fig. 3 that the projected lines $x$ and $y$ of the links 11 and 9 intersect at a point $z$ which is in advance of the axle of the rear wheels of the tractor and below the level of the point where the implement is hitched to the drawbar 2 by the pin 6. The arrangement and action of the links is such that the line of draft for the implement instead of being along the line $a—b$ which is unfavourable, is effected along a line of draft from $z—b$, which is a most favourable line of draft.

The point from which the line of draft extends (say the point $z$) continually changes as relative up and down movement takes place between the implement and the tractor, but the soil engaging parts of the implement—in the case of a plough, the share—is constrained to follow a curve which, in the plough shown in Fig. 3, approximates to the arc of a true circle whose centre is at the point $z$, so that the line of draft is from a point other than the actual hitch point $a$.

The action of the link connection in operation, is as follows:—The forward pull of the tractor tends to pull the lower link assembly downwards to the horizontal around its forward connection to the tractor thereby effecting a downward thrust on the implement and holding it down to its work whilst the pull of the tractor causes a rearward thrust by the ground on the plough bottoms 13 and 14 with the result that the plough tends to swing backwards and angularly upwards about the centre 38. This turning movement, which tends to raise the shares out of the ground, causes the upper link 11 to thrust on the plough head 4 and the abutment 3, which thrust is countered and resisted by the tractor. Under all normal conditions, and with even a very lightweight tractor, sufficient resistance is obtainable by the combined action of the mechanism to hold the plough down to its work so that the ploughing is good. In some cases, as when the plough strikes an obstacle, such as a boulder or the like, the re-action on the link connection is so great that the rear of the tractor is actually raised slightly off the ground, with the result that the rear wheels skid or spin and in this manner relieve the stress on the implement, thereby preventing damage to it.

It will be seen from the foregoing that the link 11 acts as a compression member whilst the link assembly 7, 8 and 9 acts as a tension member. The arrangement and disposition of these members, whilst providing the plough frame with freedom of up and down movement, and allowing it to be easily raised or lowered by the hand, positively prevents the implement turning upwards, of itself, out of the ground even although the shares are subjected to great resistance.

If the plough be in the raised position, as shown in Fig. 1, in order to lower it, the trigger 23 is pulled, the pull being transmitted by the wire 24 to the upper end of a cranked lever 25, fulcrumed on the hand lever 15, the lower end of the lever 25 acting on the projection $21^b$ of the pawl 21 and drawing the said pawl out of engagement with the notch $22^a$ in the quadrant 22 of the plough frame. The hand lever is then free and may be pushed backwards whereby the cross head 16, to which it is rigidly connected, is turned about the shaft 17 in such manner that the arms 18 are raised and the arm 32 lowered, a downward pull being exerted through the depth adjusting rod 33 on the upper end of the strut 12. The weight of the plough and the aforesaid pull on the strut 12 lowers the plough and simultaneously tensions the spring which is connected to the pin 28 by means of the link 27, the pin 28 being turned about the shaft 17 to a position substantially level with same. In this position the line of tension of the spring passes through both the pin 28 and shaft 17, so that it exerts no turning effect on the cross head 18.

In order to raise the plough clear of the ground the hand lever 15 is pulled forwards until the pawl 21 engages the notch $22^a$ in the quadrant 22. As the lever is moved forward it turns the cross head 16 about the shaft 17, this movement being assisted by the tension of the spring 26 as soon as the pin 28 falls below the level of the shaft 17. Meanwhile, the rear arm 32 exerts an upward force on the rod 33 thus tending to raise the upper end of strut 12 and, hence, the plough frame. The downward movement of the front arms 18, turning the cross head 16 and the rear end of the link 19, also tends to shorten the distance between the plough frame 10 and the plough head 4 thus causing the links 7, 8, 9 and 11 to swing upwards about their respective pivot pins 82 and 83.

To tilt the plough frame laterally so as to adjust the depth of the plough shares relative to one another, the link 19 is moved laterally relative to the member 4 by turning the screwed shaft 20, which engages with the internally screwed boss of the link 19. The ends of the link 11 are allowed lateral play on the pins 83 and 84 in order to allow of this tilting movement.

By turning the shaft 20 to move the links 19 to one side or other the plough frame is tilted laterally about the pin 82 so that the relative depth of the plough shares may be adjusted to give an equal depth of furrow, or otherwise, as desired.

Owing to the fact that the link connection gives the equivalent of a line of draft from a point very low down there is a tendency to lift the rear of the tractor when the implement meets with an insurmountable obstacle, such as a tree root or ledge of rock. Additional weight is thus thrown on the front wheels and counters any tendency of the tractor to turn over backwards and injure the operator. Part of the weight of the tractor thus lifted, and formerly borne by its rear wheels, is borne by the front wheels whilst the remainder is borne by the implement and helps to keep it in the ground.

Should it be desirable to use the implement where no lateral swivelling movement would be required the plough head 4 would be constructed so that when the implement would be attached there would be no freedom in the plough head jaws to allow the implement to move laterally about the pins 5 and 6.

In some cases the links 11, 7, 8 and 9 may be directly connected to the tractor, universal joints being used.

Should it be desired to carry any portion of the weight of the implement on the ground this could be done, for example, by carrying the landside of each share downwards, at the rear, until it is on a level with the point of the share. The landside would then be fitted with a plate to run on the bottom of the furrow as is customary with all ordinary types of plough.

In the examples shown in the drawings all the mechanism for controlling and adjusting the implement, such as for putting it into the ground and lifting it out; for locking it in any desired position; for controlling the depth; for varying the angle of the implement longitudinally or laterally relative to the tractor, are carried on and supplied with the implement itself.

It is to be understood that the two examples of balance motion shown for automatically keeping the implement at a regular depth of cut have no effect on the general operation of the main links 7, 8, 9 and 11, in Figs. 1, 3 and 4, and 7, 8, 9, 11, 42, 43 and 44 in Figs. 6 and 7. The mechanism for keeping the implement at a regular depth of cut, irrespective of the movements of the tractor, acts independently of the link connection. The link connection gives the necessary line of draft and utilizes a portion of the weight of the tractor to keep a light implement in the ground, and also gives the other advantages herein set forth.

It will be seen from Fig. 10 that the pawl 21 and quadrant 22 are so arranged as to operate in one direction without the necessity for lifting the pawl. This is to prevent the rear end of the tractor from being supported by the implement and so causing wheel slip should the front wheels of the tractor run up on a height or should the rear wheels drop into a hollow.

Having now fully described my invention what I claim and desire to secure by Letters Patent is:—

1. In an agricultural implement adapted to be operated mechanically, a connection for coupling said implement to its operating mechanism and means forming a part of the connection whereby the implement can be kept automatically at a regular working depth when in operation and irrespective of inequalities in the contour of the ground.

2. In an agricultural implement adapted to be operated mechanically, a connection for coupling said implement to its operative mechanism whereby when in operation, it can be permitted to move up and down and means forming a part of the connection whereby the implement can be kept automatically at a regular working depth when in operation and irrespective of inequalities in the contour of the ground.

3. In an agricultural implement adapted to be operated mechanically, a connection for coupling said implement to its operative mechanism whereby, when in operation it can be permitted to move up and down and laterally and means forming a part of the connection whereby the implement can be kept automatically at a regular working depth when in operation and irrespective of inequalities in the contour of the ground.

4. In an agricultural implement adapted to be operated mechanically, a connection for coupling said implement to its operative mechanism, means forming a part of the connection adapted to automatically keep the implement at a regular working depth during its operation irrespective of inequalities in the contour of the ground, and means for altering the working depth at will.

5. An agricultural implement adapted to be operated mechanically having a connection for coupling said implement to its operative mechanism and adapted to permit of up and down movement, means operated automatically by relative movement of the implement or its operative mechanism and the connection to keep the implement at a regular working depth during its operation irrespective of inequalities in the contour of the ground, and means for altering the working depth at will.

6. An agricultural implement adapted to be operated mechanically having a connection for coupling said implement to its operative mechanism and adapted to permit of up and down and lateral movements, means operated automatically by relative movement of the implement or its operative mechanism and the connection to keep the implement at a regular working depth during its operation irrespective of inequalities in the contour of the ground, and means for altering the working depth at will.

7. In an agricultural implement adapted to be operated mechanically, a connection for coupling said implement to its operative mechanism whereby it is permitted to move up and down, means operated automatically by relative movement of the implement or its operative mechanism and the connection to keep the implement at a regular working depth during its operation irrespective of inequalities in the contour of the ground, and means for raising the implement from its operative position when required.

8. In an agricultural implement adapted to be operated mechanically, a connection for coupling said implement to its operative mechanism whereby it is permitted to move up and down and laterally, means operated automatically by relative movement of the implement or its operative mechanism and the connection to keep the implement at a regular working depth during its operation irrespective of inequalities in the contour of the ground, and means for raising the implement from its operative position when required.

9. For a mechanically operable agricultural implement, a connection for coupling the implement to its operating mechanism including means on the implement out of contact with the ground for keeping the implement at a regular working depth during operation irrespective of inequalities in the contour of the ground, means whereby the working depth can be altered at will, and means whereby the implement can also be raised from its operative position.

10. For a mechanically operable agricultural implement, a connection for coupling the implement to its operating mechanism including means on the implement out of contact with the ground for keeping the implement at a regular working depth during operation irrespective of inequalities in the contour of the ground, means permitting the coupled implement to move up and down, means whereby the working depth can be altered at will, and means whereby the implement can also be raised from its operative position when required.

11. For a mechanically operated agricultural implement a connection for coupling the implement to its operating mechanism, including means on the implement out of contact with the ground for keeping the implement at a regular working depth during operation irrespective of inequalities in the contour of the ground, means permitting the coupled implement to move up and down and from side to side, means whereby the working depth can be altered at will, and means whereby the implement can also be raised from its operative position.

12. In an agricultural implement adapted to be drawn by a tractor, a link connection for coupling the implement to the tractor including means on the implement out of contact with the ground whereby the resistance of the ground to the implement under the pull of the tractor and the penetration of the implement are utilized automatically to control its working depth.

13. An agricultural implement adapted to be drawn by a tractor having a link connection adapted to couple the implement to the tractor and carry the weight of the implement when coupled, means forming a part of the connection for automatically keeping the implement at a regular working depth during its operation irrespective of inequalities in the contour of the ground over which it may be drawn by the tractor, and means whereby the working depth can be altered at will.

14. An agricultural implement adapted to be drawn by a tractor having a link connection adapted to couple the implement to the tractor and carry the weight of the implement when coupled, means forming a part of the connection for automatically keeping the implement at a regular working depth during its operation irrespective of inequalities in the contour of the ground, and means for raising the implement from its operative position when required.

15. An agricultural implement adapted to be drawn by a tractor having a link connection adapted to couple the implement to the tractor and carry the weight of the implement when coupled and including means for permitting the implement upward and downward movement, and means operated automatically by relative movement of the implement or the tractor and the connection to keep the implement at a regular working depth during its operation irrespective of inequalities in the contour of the ground.

16. An agricultural implement adapted to be drawn by a tractor having a link connection adapted to couple the implement to the tractor and carry the weight of the implement when coupled and including means for permitting the implement upward and downward movement, and lateral movement, and means operated automatically by relative movement of the implement or the tractor and the connection to keep the implement at a regular working depth during its operation irrespective of inequalities in the contour of the ground.

17. In an agricultural implement adapted to be operated mechanically a connection for coupling said implement to its operating mechanism, means forming a part of the connection whereby the implement can be kept automatically at a regular working depth when in operation irrespective of inequalities in the contour of the ground, and means for raising the implement and supporting it on its operating mechanism, said last recited means including a pawl and quadrant arranged to operate in one direction without the necessity for lifting the pawl.

18. An agricultural implement adapted to be drawn by a tractor having a connection for coupling the implement to the tractor including means whereby the weight of the implement can be wholly carried by the tractor when in operation, and means forming a part of the connection providing freedom of up and down movement and for automatically keeping the implement at a regular working depth during its operation irrespective of inequalities in the contour of the ground over which it may be drawn by the tractor.

19. In or for an agricultural implement adapted to be drawn by a tractor, a jointed link connection for coupling the implement to the tractor having means permitting the implement free upward and downward and lateral movements, means for raising and lowering the implement, means for holding it in different positions, and means operated automatically by relative movement of the implement or the tractor and the connection whereby the implement is kept at a regular working depth during its operation irrespective of inequalities in the contour of the ground.

20. In or for an agricultural implement adapted to be drawn by a tractor, a jointed link connection for coupling the implement to the tractor, having means permitting the implement free upward and downward and lateral movements, means for raising and lowering the implement, means for balancing the weight of the implement, means for holding it in different positions and means operated automatically by relative movement of the implement or the tractor and the connection whereby the implement is kept at a regular working depth during its operation irrespective of inequalities in the contour of the ground.

21. In or for an agricultural implement adapted to be drawn by a tractor, a jointed link connection for coupling the implement to the tractor having means permitting the implement free upward and downward and lateral movements, means for raising and lowering the implement, means for adjusting the implement laterally relatively to the tractor, means for holding it in different positions and means operated automatically by relative movement of the implement or the tractor and the connection whereby the implement is kept at a regular working depth during its operation irrespective of inequalities in the contour of the ground.

22. In an agricultural implement adapted to be drawn by a tractor, a link connection for coupling the implement to the tractor including means whereby the weight of the implement is caused to be carried by the tractor, means for permitting the upward and downward movement and lateral movement of the implement, means operated automatically by relative movement of the implement or the tractor and the connection for automatically keeping the implement at a regular working depth during its operation irrespective of inequalities in the contour of the ground, means whereby the working depth can be altered at will, and means whereby the implement can be raised from its operative position when required.

23. In an agricultural implement adapted to be drawn by a tractor, a jointed link connection for coupling the implement to the tractor which when coupled to the tractor gives an actual line of draft from a point lower than the actual hitch point, and has means forming a part of the connection for automatically keeping the implement at a regular working depth during its operation irrespective of inequalities in the contour of the ground over which it may be drawn by the tractor.

24. A connection for coupling an implement to a tractor comprising means which, when the implement is pulled by the tractor, exerts a downward pull or pressure on the implement and holds it down to its work, means preventing the implement, whilst in operation, from turning angularly around the first mentioned means forming a part of the connection, and means for automatically balancing the downward pull on the implement to keep it at a regular working depth.

25. A jointed link connection for coupling an implement to a tractor comprising means which, when the implement is pulled by the tractor, exerts a downward pull or pressure on the implement and holds it down to its work, means preventing the implement, whilst in operation, from turning angularly around the first mentioned means, and means forming a part of the connection for automatically balancing the downward pull on the implement to keep it at a regular working depth.

26. A connection for coupling an implement to a tractor comprising means which, when the implement is pulled by the tractor, exerts a downward pull or pressure on the implement and holds it down to its work, means preventing the implement, whilst in operation, from turning angularly upwards around the first mentioned means, the said means allowing the tractor and implement free relative up and down movement and means forming a part of the connection for automatically balancing the downward pull on the implement to keep it at a regular working depth.

27. A connection for coupling an implement to a tractor comprising means which, when the implement is pulled by the tractor, exerts a downward pull or pressure on the implement and holds it down to its work, means preventing the implement, whilst in operation, from turning angularly upwards around the first mentioned means, the said means allowing the implement to move laterally relative to the tractor, and means forming a part of the connection for automatically balancing the downward pull of the implement to keep it at a regular working depth.

28. A connection for coupling an implement to a tractor comprising means which, when the implement is pulled by the tractor, exerts a downward pull or pressure on the implement and holds it down to its work, means preventing the implement, whilst in operation, from turning angularly upwards around the first mentioned means, the said means allowing the tractor and implement to move relatively up and down and from side to side, and means forming a part of the connection for automatically balancing the downward pull on the implement to keep it at a regular working depth irrespective of inequalities in the contour of the ground.

29. A connection for coupling an implement to a tractor comprising means which, when the implement is pulled by the tractor, exerts a downward pull or pressure on the implement and holds it down to its work, means preventing the implement, whilst in operation from turning angularly around the first mentioned means, means for adjusting the implement laterally, means for raising the implement and supporting it on the tractor, and means forming a part of the connection for automatically balancing the downward pull on the implement to keep it at a regular working depth.

30. A device for hitching an agricultural implement to a tractor, comprising, in combination, a hitch member for connecting the implement to the tractor, lower link members pivotally secured to said hitch member and adapted to exert a downward force on the implement under the draft of the tractor to keep it properly at work in the ground, upper link members pivotally connected with the hitch member and with the implement for preventing the implement turning about its point of connection with said lower link members, and depth control gear comprising a cross-head turnably carried by the implement frame, means pivotally connecting said cross head with the hitch member and a depth adjusting means for actuating said cross head.

31. A device for hitching an agricultural implement to a tractor comprising, in combination, a hitch member for connecting the implement to the tractor, lower link members pivotally secured to said hitch member and adapted to exert a downward force on the implement under the draft of the tractor to keep it properly at work in the ground, upper link members pivotally connected with the hitch member and with the implement for preventing the implement turning about its point of connection with said lower link members, means for manually raising and lowering the implement relative to the tractor, and depth control gear comprising a cross head turnably carried by the implement frame, links pivotally connecting said cross head with the hitch member and a depth adjusting screw for actuating said cross head.

32. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, and depth control gear comprising a cross head turably carried by the implement frame, links pivotally connecting said cross head with the swivel head and a depth adjusting screw for actuating said cross head.

33. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, and depth control gear comprising a cross head turnably carried by the implement frame, means pivotally connecting said cross head with the swivel head and a depth adjusting screw for actuating said cross head.

34. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for moving the implement laterally relative to the tractor, and depth control gear comprising a cross head turnably carried by the implement frame, means pivotally connecting said cross head with the swivel head and a depth adjusting means for actuating said cross head.

35. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, means for moving the implement laterally relative to the tractor, and depth control gear comprising a cross head turnably carried by the implement frame, links pivotally connecting said cross head with the swivel head and a depth adjusting screw for actuating said cross head.

36. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for moving the implement laterally relative to the tractor, and depth control gear comprising a cross head turnably carried by the implement frame, links pivotally connecting said cross head with the swivel head, and a depth adjusting screw for actuating said cross head.

37. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, means for moving the implement laterally relative to the tractor, and depth control gear comprising a cross head turnably carried by the implement frame, a link pivotally connecting said cross head with the swivel head and a depth adjusting screw for actuating said cross head.

38. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, means for moving the implement laterally relative to the tractor, and depth control gear comprising a cross head turnably carried by the implement frame, means for locking the cross head in position, a link pivotally connecting said cross head with the swivel head and a depth adjusting screw for actuating said cross head.

39. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, means for moving the implement laterally relative to the tractor, and depth control gear comprising a cross head turnably carried by the implement frame, a plate connected to said cross head, a spring connected to said plate and to the implement, a link pivotally connecting said cross head with the swivel head and a depth adjusting screw for actuating said cross head.

40. A device for hitching an agricultural implement to a tractor comprising, in combination, a swivel head adapted for connection to the tractor, lower link members pivotally connected to said head and to the implement whereby a downward force is exerted on the latter under the draft of the tractor to keep it down to its work, upper link members pivoted to said head and connected with the implement for preventing it turning about its point of connection with said lower link members, means for manually raising and lowering the implement relative to the tractor, means for moving the implement laterally relative to the tractor, and depth control gear comprising a cross head turnably carried by the implement frame, an arm on the cross head, a plate connected to said cross head arm, a spring connected to said plate and to the implement, a link pivotally connecting said cross head with the swivel head and a depth adjusting screw for actuating said cross head.

41. A device for hitching an agricultural implement to a tractor comprising, in combination, a swivel head adapted for connection to the tractor, a set of three lower link members pivotally connected to said head and to the implement one of said members being arranged diagonally between the other two, an upper link pivoted to said head, a double strut pivotally connected to the implement and to said upper link, means for manually raising and lowering the implement relative to the tractor, and depth control gear comprising a cross head turnably carried by the implement frame, means pivotally connecting said cross head with the swivel head and depth adjusting means for actuating said cross head.

42. A device for hitching an agricultural implement to a tractor comprising, in combination, a swivel head adapted for connection to the tractor, a set of three lower link members pivotally connected to said head and to the implement one of said members being arranged diagonally between the other two, an upper link pivoted to said head, a double strut pivotally connected to the implement and to said upper link, depth control gear carried by the implement frame, and means for manually raising and lowering the implement relative to the tractor, said means including a laterally adjustable link bracket pivotally connected to the swivel head, a cross head pivotally supported by the implement frame and connected with said link bracket and a control lever for actuating said cross head.

In testimony whereof I affix my signature in presence of two witnesses.

HARRY FERGUSON.

Witnesses:
ANDREW HAMILTON,
JOHN HERBERT HUNTER.